United States Patent
Stark et al.

(10) Patent No.: US 9,930,417 B2
(45) Date of Patent: Mar. 27, 2018

(54) VIDEO BROWSER

(71) Applicant: Time Warner Cable Enterprises LLC, St. Louis, MO (US)

(72) Inventors: James C. Stark, Broomfield, CT (US); Alexandra Cottrell, Wayne, PA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 13/940,100

(22) Filed: Jul. 11, 2013

(65) Prior Publication Data

US 2015/0020100 A1 Jan. 15, 2015

(51) Int. Cl.
*H04N 5/445* (2011.01)
*H04N 21/482* (2011.01)
H04N 21/422 (2011.01)
H04N 21/488 (2011.01)

(52) U.S. Cl.
CPC ..... *H04N 21/482* (2013.01); *H04N 21/42209* (2013.01); *H04N 21/4886* (2013.01)

(58) Field of Classification Search
CPC ............ H04N 21/42209; H04N 21/4886
USPC .................................. 725/40, 44, 48
See application file for complete search history.

(56) References Cited

U.S. PATENT DOCUMENTS

| 7,685,619 | B1* | 3/2010 | Herz ........................... 725/52 |
| 8,442,110 | B2* | 5/2013 | Pavlovskaia ........... H04N 7/163 348/461 |
| 2002/0053084 | A1* | 5/2002 | Escobar et al. ................ 725/47 |
| 2007/0022450 | A1* | 1/2007 | Kim et al. ....................... 725/86 |
| 2007/0162667 | A1* | 7/2007 | Kim et al. ....................... 710/62 |
| 2007/0208718 | A1* | 9/2007 | Javid ................. G06F 17/30017 |
| 2009/0210910 | A1* | 8/2009 | Smith et al. ..................... 725/56 |
| 2010/0114857 | A1* | 5/2010 | Edwards ........... G06F 17/30817 707/709 |
| 2010/0169915 | A1* | 7/2010 | Lee .................................. 725/32 |
| 2011/0078738 | A1* | 3/2011 | Papaspyropoulos H04N 21/4312 725/40 |
| 2012/0311637 | A1* | 12/2012 | Anthru .................. H04N 5/445 725/44 |

* cited by examiner

*Primary Examiner* — Pankaj Kumar
*Assistant Examiner* — Sahar Baig
(74) *Attorney, Agent, or Firm* — Chapin IP Law, LLC (57) ABSTRACT

In an embodiment, a computing device may display a video browser screen on an output device. The video browser screen may include a list of video programs arranged as a carousel. The carousel may have a plurality of entries, where an entry may represent a video program that may be provided by a service provider. A video program represented by an entry may be, for example, a live video program, a video program available on demand, or a video program that may have been recorded by a device that may be provided by the service provider. The computing device may acquire an indication to navigate to an entry in the carousel. The computing device may navigate to the entry and acquire an indication to select the entry. The computing device may select the entry and display the video program associated with the selected entry on the output device.

28 Claims, 8 Drawing Sheets

VIDEO BROWSER

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Techniques described herein may involve, for example, displaying a video browser screen on an output device. The video browser screen may include, for example, a list of video programs arranged as a carousel. The carousel may have, for example, a plurality of entries that may include an entry that may represent a video program being aired by a service provider. An indication to navigate to the entry may be acquired (e.g., read, received). The entry may be navigated to and an indication to select the entry may be acquired. The entry may be selected and the video program associated with the selected entry may be displayed, for example, on the output device.

Techniques described herein may be implemented in a computing device. Examples of computing devices that may implement techniques described herein may include, but are not limited to, set-top boxes (STBs), smart phones, tablets, ultrabooks, laptops, mainframes, servers, and desktop computers.

Figure 1:
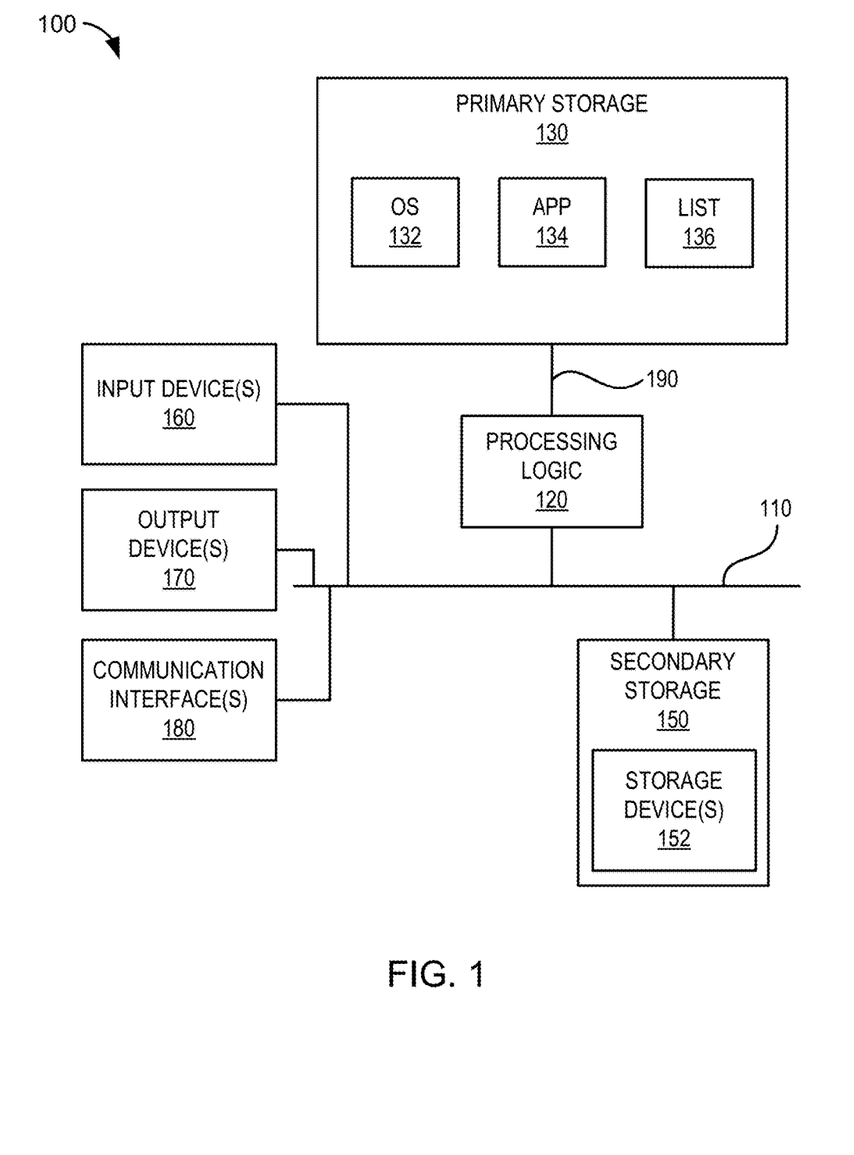
FIG. 1 illustrates a block diagram of an example embodiment of a computing device that may be used to implement a video browser.

FIG. 1 illustrates a block diagram of an example embodiment of a computing device 100 that may perform techniques described herein. Referring to FIG. 1, computing device 100 may include various components, such as, for example, processing logic 120, primary storage 130, secondary storage 150, input devices 160, output devices 170, and/or communication interfaces 180.

It should be noted that FIG. 1 illustrates an example embodiment of computing device 100. Other embodiments of computing device 100 may include more components or fewer components than the components illustrated in FIG. 1. Further, the components may be arranged differently than as illustrated in FIG. 1.

For example, in an embodiment of computing device 100, secondary storage 150 may be contained at a remote site that may provide "cloud" storage. The site may be accessible to computing device 100 via a communications network, such as, for example, the Internet. A communication interface 180 may be used to interface the computing device 100 with the communications network.

Also, it should be noted that functions performed by various components contained in other embodiments of computing device 100 may be distributed among the components differently than as described herein.

Computing device 100 may include an input/output (I/O) bus 110 that may enable communication among components in computing device 100. These components may include, for example, processing logic 120, secondary storage 150, one or more input devices 160, one or more output devices 170, and/or one or more communication interfaces 180. The communication may include transferring, for example, control signals and/or data between the components. I/O busses that may be used to implement I/O bus 110 may include, for example, serial AT attachment (SATA), peripheral component interconnect (PCI), PCI express (PCI-e), universal serial bus (USB), small computer system interface (SCSI), serial attached SCSI (SAS), and/or some other I/O bus.

Computing device 100 may include a memory bus 190 that may enable information to be transferred between processing logic 120 and primary storage 130. The information may be stored in primary storage 130 and may include, for example, computer-executable instructions and/or data that may be executed, manipulated, and/or otherwise processed by processing logic 120.

Processing logic 120 may include logic for interpreting, executing, and/or otherwise processing information. The information may include information that may be stored in, for example, primary storage 130 and/or secondary storage 150. In addition, the information may include information that may be acquired (e.g., read, received) by one or more input devices 160 and/or communication interfaces 180.

Processing logic 120 may include a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), systems on chip (SoCs), and/or other types of processing logic that may, for example, interpret, execute, manipulate, and/or otherwise process information, such as the information described above. Processing logic 120 may comprise a single core or multiple cores. An example of an SoC that may be used to implement processing logic 120 is the Intel® Atom™ CE5300 SoC available from Intel Corporation, Santa Clara, Calif.

Input devices 160 may include one or more devices that may be used to input information into computing device 100. The devices may include, for example, a keyboard, computer mouse, microphone, camera, touch pad, stylus, graphics tablet, touch screen, joystick (isotonic or isometric), pointing stick, accelerometer, multipoint input device, discrete pointing device, remote control device (e.g., television remote control device, STB remote control device), analog-to-digital converter (ADC), infrared device, Bluetooth device, and/or some other input device. The information may include spatial (e.g., continuous, multi-dimensional) data that may be input into computing device 100 using, for example, a pointing device, such as a computer mouse. The information may also include other forms of data, such as, for example, digital codes that may be associated with keys on a remote control device.

Output devices 170 may include one or more devices that may output information from computing device 100. The information may be output, for example, in digital form and/or analog form (e.g., analog audio frequency signals). The devices may include, for example, a cathode ray tube (CRT), plasma display device, light-emitting diode (LED) display device, liquid crystal display (LCD) device, speaker, video projector, touch screen, television screen, video monitor, digital-to-analog converter (DAC), sound card, and/or some other output device.

Output devices 170 may be directed by, for example, processing logic 120, to output the information from computing device 100. Outputting the information may include presenting (e.g., displaying, printing) the information on an output device 170. The information may include, for example, text, graphical user interface (GUI) elements (e.g., windows, widgets, and/or other GUI elements), audio (e.g., music, sounds), and/or other information that may be outputted by output devices 170. Output devices 170 may employ one or more protocols that may be used to output the information. For example, output devices may employ the high definition multimedia interface (HDMI) protocol and/or the Sony/Philips Digital Interconnect Format (S/PDIF) protocol.

Communication interfaces 180 may include logic for interfacing computing device 100 with, for example, one or more communications networks and enable computing device 100 to communicate with one or more entities (e.g., nodes) coupled to the communications networks. The communications networks may include, for example, cable networks, the Internet, wide-area networks (WANs), local area networks (LANs), 3G and/or 4G (e.g., 4G long-term evolution (LTE)) networks. Communication interfaces 180 may include one or more transceiver-like mechanisms that may enable computing device 100 to communicate with entities coupled to the communications networks. Examples of communication interfaces 180 may include a built-in network adapter, multiplex over coax (MoCA) adapter, radio frequency (RF) tuner, network interface card (NIC), Personal Computer Memory Card International Association (PCMCIA) network card, card bus network adapter, wireless network adapter (e.g., WiFi module), Universal Serial Bus (USB) network adapter, modem, and/or other device suitable for interfacing computing device 100 to a communications network.

Primary storage 130 may provide a tangible non-transitory primary storage for computing device 100. The primary storage may be used to store information. Primary storage 130 may be accessible to processing logic 120 via memory bus 190, which may be a point-to-point interconnect bus that may enable information to be transferred between primary storage 130 and processing logic 120. Information stored by primary storage 130 may include computer-executable instructions and/or data that may implement operating system (OS) 132, application (APP) 134, and list 136. The computer-executable instructions may be executed, interpreted, and/or otherwise processed by processing logic 120.

OS 132 may be a conventional operating system that may implement various conventional operating system functions. The functions may include, for example, scheduling one or more portions of APP 134 to run on (e.g., be executed by) the processing logic 120, managing primary storage 130, controlling access to various components in computing device 100 (e.g., input devices 160, output devices 170, communication interfaces 180, secondary storage 150), and/or controlling access to information received and/or transmitted by these components.

Examples of operating systems that may be used to implement OS 132 may include the Linux operating system, Microsoft Windows operating system, the Symbian operating system, Mac OS X operating system, iOS operating systems, the Android operating system, or some other operating system. A distribution of the Linux operating system that may be used is Red Hat Linux available from Red Hat Corporation, Raleigh, N.C. Versions of the Microsoft Windows operating system that may be used include Microsoft Windows Mobile, Microsoft Windows 8, Microsoft Windows 7, Microsoft Windows Vista, and Microsoft Windows XP operating systems available from Microsoft Inc., Redmond, Wash. The Symbian operating system is available from Accenture PLC, Dublin, Ireland. The Mac OS X and iOS operating systems are available from Apple, Inc., Cupertino, Calif. The Android operating system is available from Google, Inc., Menlo Park, Calif.

APP 134 may be a software application that may include provisions for implementing a video browser. APP 134 may include computer-executable instructions that may implement the video browser. The executable instructions may be executed, for example, by processing logic 120.

Features provided by the video browser may include, for example, (1) displaying a list of video programs (e.g., broadcast programs, television shows, movies), (2) enabling the list to be navigated, and (3) enabling a selection of a video program in the list. As will be described further below, the list of video programs may be arranged as a carousel having a plurality of entries where an entry may represent a video program. An entry in the carousel may be selected and a video program associated with the selected entry may be displayed on an output device 170. A video program represented by an entry in the list of video programs may include a video program being aired (e.g., transmitted, streamed) by a service provider (e.g., a cable television provider, mass media provider, television station, Internet based video provider, server). The video program may be aired as part of a live video feed that may be provided by the service provider to, for example, a subscriber. Here, the video program may be considered a live video program. Alternatively or in addition to, a video program represented by an entry in the list of video programs may include, for example, a video program that (1) may be available on demand (e.g., video-on-demand (VOD) video program, pay-per-view (PPV) video program) from the service provider and/or (2) may have been recorded by a video recording device (e.g., a digital video recorder (DVR)) that may be provided by the service provider.

List 136 may include a data structure that may contain information about video programs. List 136 may contain plurality of entries that may hold the information. Examples of data structures that may be used to implement list 136 may include a database, table, linked-list, and/or other types of data structures.

An entry in list 136 may represent, for example, a video program and may include information about the video program. A video program represented by an entry may be a currently airing program. Information in an entry may include, for example, a title, description, video channel number, start time of the video program, duration of the video program, a tag that may identify a genre or type of video program (e.g., sports program, action movie, television series), and/or other information that may be associated with the video program.

List 136 may include other information that may be related to video programs and/or users of computing device 100. For example, a subscriber may subscribe to certain video channels that may be provided by a service provider. List 136 may include video program information about video programs currently airing on the video channels subscribed to by the subscriber. In another example, list 136 may include (1) a list of favorite channels and/or video programs of a particular user and/or (2) a history of channels and/or video programs viewed by the user.

Secondary storage 150 may provide a tangible non-transitory secondary storage for computing device 100. Secondary storage 150 include one or more storage devices 152 that may be used to implement the secondary storage. The storage devices 152 may be accessible to processing logic 120 via I/O bus 110. The storage devices 152 may store information. The information may include computer-executable instructions and/or data. The information may be executed, interpreted, manipulated, and/or otherwise processed by processing logic 120.

The storage devices 152 may include volatile and/or non-volatile storage. Examples of storage devices 152 may include magnetic disk drives, optical disk drives, random-access memory (RAM) disk drives, flash drives, solid-state disks (SSDs), and/or hybrid drives. The information may be stored on one or more non-transitory tangible computer-readable media contained in the storage devices 152. Examples of non-transitory tangible computer-readable media that may be contained in the storage devices may include magnetic discs, optical discs, volatile memory devices, and non-volatile memory devices.

Figure 2:
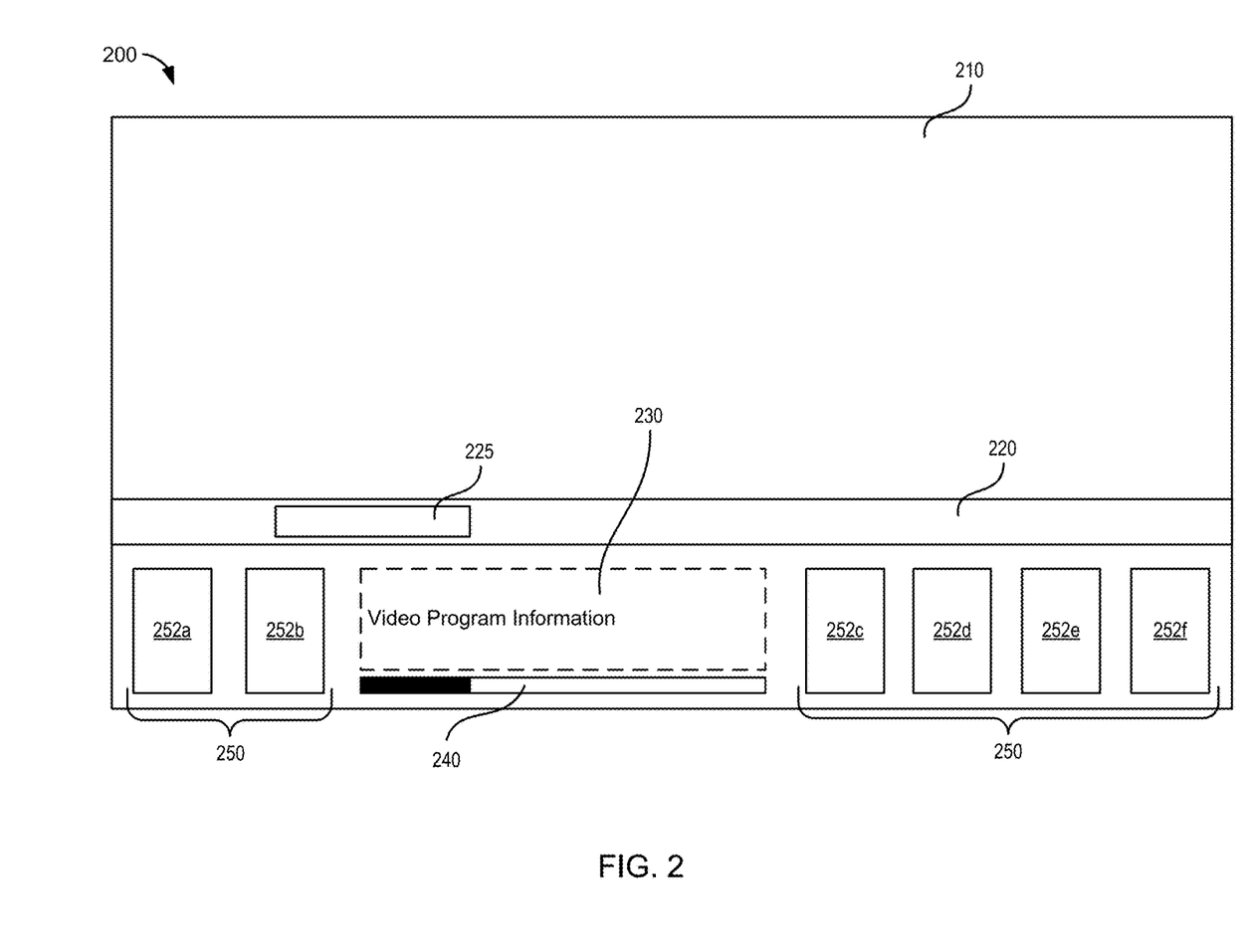
FIG. 2 illustrates an example of a video browser screen that may be associated with a video browser.

As noted above, APP 134 may include provisions for displaying a list of video programs that may be provided by, for example, a service provider. FIG. 2 illustrates an example video browser screen 200 that may be displayed by APP 134. Screen 200 may enable a user to browse a list of video programs being aired by a service provider.

Referring to FIG. 2, the screen 200 may include a scaled video area 210, a filter bar 220, a video program information area 230, a progress bar 240, and a video program listing 250. The scaled video area 210 may display video from a video program being currently viewed. The video program being currently viewed may be, for example, a video program that may be viewed at the time screen 200 is displayed.

For example, suppose computing device 100 is an STB and an input device 160 associated with the computing device is a remote control. A user may use the remote control to specify a cable channel that may be provided by a service provider. The STB may tune to that channel and display a video program being broadcast on that channel by the service provider. The video program may be displayed by the STB on an output device 170, such as a television screen. The scaled video area 210 may provide a scaled version of the video program when screen 200 is displayed.

Filter bar 220 may display one or more filters 225 that may be used to identify information displayed in the video program listing 250. For example, suppose a filter 225 is defined as "the last ten video channels that a user has viewed". Further, suppose that the information displayed in the video program listing 252a-f includes information other than the last ten video channels that the user has viewed. The user may navigate to the filter 225 in the filter bar 220 and select the filter 225. After the filter 225 is selected, information displayed in video program listing 250 may be updated to display video program information about six of the last ten video channels the user has viewed.

The filter bar 220 may display information about a filter that has been selected. For example, suppose the above-described filter was selected. After filter has been selected and the video program listing 250 has been updated based on the selected filter, the filter bar 220 may display the text "Now viewing the most recently viewed channels".

Video program information area 230 may display information about a video program. The information may include, for example, a title, brief description, secondary information (e.g., language, second audio program (SAP) information), a channel number, program network designator (e.g., an icon that represents a source of the video program), and/or other information that may be associated with the video program. The video program may be, for example, a video program being shown in the scaled video area 210 or a video program listed in the video program listing 250.

For example, suppose a video program is currently being displayed on an output device 170 when a user uses an input device 160 to direct computing device 100 to display screen 200. The video program information area 230 may initially provide information about the video program being displayed. As the user navigates through the video program listing 250, the video program information area 230 may be updated to provide information about, for example, video programs navigated to in the video program listing 250.

Progress bar 240 may indicate a progress associated with a video program. The video program may be, for example, a video program being currently viewed or a video program listed in the video program listing 250. For example, suppose a user navigates to a video program listed in the video program listing 250. Progress bar 240 may graphically indicate a progress of the video program (e.g., an amount of elapsed time associated with the video program, an amount of time left for the video program) that has been navigated to.

Video program listing 250 may provide information about video programs. The video programs may include video programs that are, for example, being aired by a service provider. Video program listing 250 may provide the information in one or more video program listing entries 252a-f. An entry 252 may represent a video program. An entry 252 may provide information that may be associated with the video program it represents. The video program may be, for example, a video program that may be aired by a service provider.

For example, suppose that a user subscribes to six video channels that may be provided by a service provider. Further, suppose that channels are numbered one through six and that each of the channels is airing a video program. Video program listing entries 252a-f may represent and provide information about the video programs airing on the six channels. Specifically, entry 252a may represent and provide information about the video program airing on channel one, entry 252b may represent and provide information about the video program airing on channel two, and so on.

A video program listing entry 252 may provide information associated with a video program using, for example, text and/or graphics. For example, suppose video program listing entry 252a provides information about a video program currently airing on a particular video channel. Entry 252a may include an icon or an image from the video program to represent the video program in the video program listing 250. Entry 252a may also include text (e.g., a title) that may briefly describe the video program and/or the video channel.

The video program listing entries 252a-f may be arranged to form a carousel. The carousel may rotate as the video program listing 250 is navigated. The rotation may be, for example, leftwards or rightwards depending on how the video program listing 250 is navigated.

For example, suppose list 136 contains entries for ten different video programs numbered one through ten. Further suppose that video program listing entries 252*a-f* contain information about the video programs associated with the first six entries in the list 136. Now suppose a user navigates the video program listing 250 from left to right. Navigating to the right of video program listing entry 252*f* may cause the video program listing entries 252*a-f* to change to display information associated with second through seventh entries in the list 136.

Figure 3:
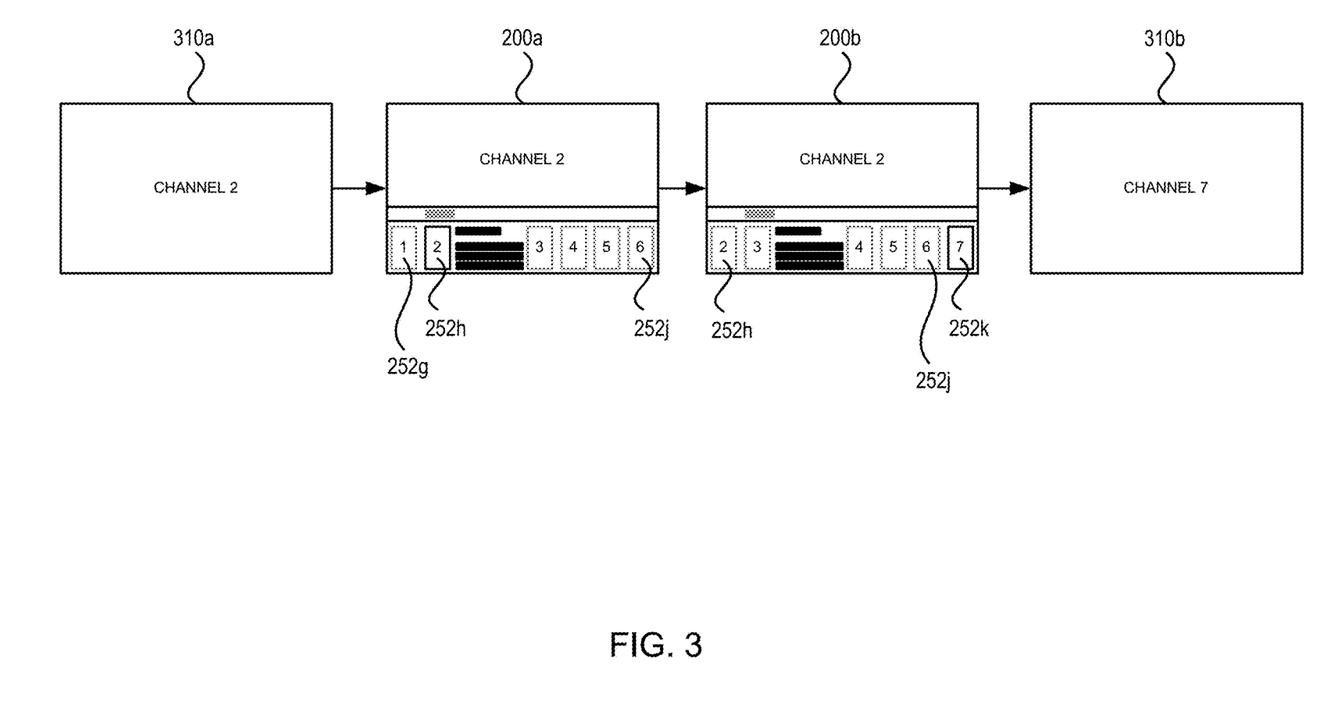
FIG. 3 illustrates an example of selecting a video program using a video browser screen.

FIG. 3 illustrates an example operation of the video program listing 250. Referring to FIG. 3, suppose that a user is viewing a video program that is currently airing on video channel two, as illustrated in screen 310*a*. Now suppose the user uses an input device 160 to generate an indication to enter a video browser that may be provided by APP 134. APP 134 may acquire (e.g., receive) the indication and display screen 200*a*. APP 134 may display a scaled version of the video program in a scaled video area 210 of screen 200*a*.

APP 134 may also display a video program listing 250. Suppose video program listing entries 252*g*, 252*h*, and 252*j*, provide information about video programs that may be currently airing on video channels one, two, and six, respectively. Since a scaled version of the video program airing on channel two is currently being displayed in a scaled video area 210 of screen 200*a*, APP 134 may provide an indication of this condition in video program listing entry 252*h*. For example, APP 134 may highlight a border of video program listing entry 252*h* to indicate that the video program represented by video program listing entry 252*h* is currently being displayed in the scaled video area 210 of screen 200*a*.

Now suppose the user uses the input device 160 to generate one or more indications to navigate the video programming listing 250 from video program listing entry 252*h* to video program listing entry 252*j*. APP 134 may acquire the indications and highlight video program listing entry 252*j* to indicate that the user has navigated to video program listing entry 252*j*.

Moreover, APP 134 may display information about a video program represented by video program listing entry 252*j* in a video program information area 230 in screen 200*a*. The information about the video program may be displayed, for example, after navigating to the video program listing entry 252*j* or after APP 134 acquires an indication generated by the input device 160 to display the information.

For example, the user may navigate to video program listing entry 252*j* as described above. After navigating to the video program listing entry 252*j*, APP 134 may automatically display information about the video program associated with video program listing entry 252*j* in a video program information screen area 230 of screen 200*a*. Alternatively or in addition to, after navigating to video program listing entry 252*j*, the user may direct the input device 160 to generate an indication to display information about the video program represented by program listing entry 252*j* (e.g., by pressing a button on the input device 160). APP 134 may acquire the indication and display information about the video program represented by video program listing entry 252*j*. The information may be displayed in a video program information area 230 of screen 200*a*.

Now suppose the user uses the input device 160 to generate an indication to navigate one position beyond the video program listing entry 252*j*. APP 134 may display screen 200*b* after acquiring this indication. Note that in screen 200*b*, video program listing 250 acts as a carousel in that information provided by the video program listings 252 have shifted one position to the left. Also note that video program listing entry 252*g* has been dropped and a new video program listing entry 252*j* has been added to the video program listing 250.

Suppose that video program listing 252*j* provides information about a video program currently airing on channel seven. In addition, suppose that the user uses the input device 160 to generate an indication to select the video program currently airing on channel seven for viewing. APP 134 may acquire the indication and display screen 310*b*. Screen 310*b* may display a video program currently airing on channel seven.

Figure 4:
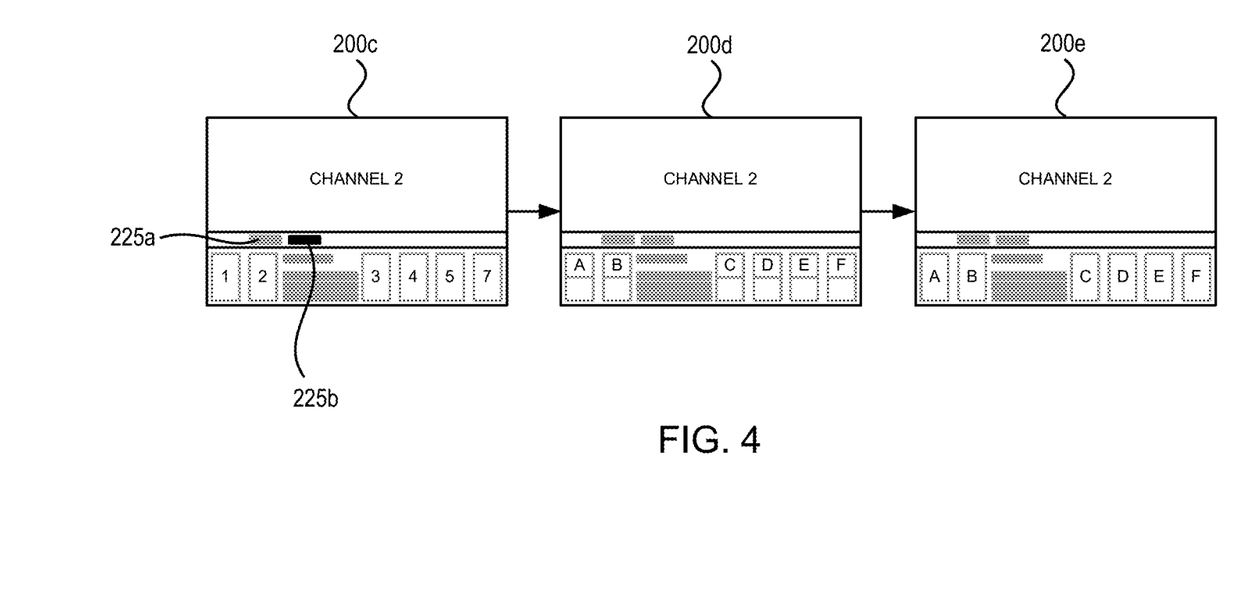
FIG. 4 illustrates an example of a carousel that may be included in a video browser screen.

APP 134 may include provisions to navigate and select filters 225 in the filter bar 220. FIG. 4 illustrates an example of navigating filter bar 220 and selecting a filter 225 in the filter bar 220. Referring to FIG. 4, suppose that APP 134 displays screen 200*c* on an output device 170. Note that the filter bar 220 in screen 200*c* includes filters 225*a* and 225*b*. Suppose, for example, that a user uses an input device 160 to generate an indication to navigate to the filter bar 220. APP 134 may acquire the indication and navigate to the filter bar 220.

Now suppose the user uses the input device 160 to generate an indication to navigate to filter 225*b* in the filter bar 220. APP 134 may acquire the indication and navigate to filter 225*b*. APP 134 may indicate in screen 200*c* that filter 225*b* has been navigated to. For example, APP 134 may highlight text in the filter bar 220 that may identify filter 225*b* to indicate that filter 225*b* has been navigated to. Note that other techniques for indicating that a filter 225 has been navigated to may be used.

After filter 225*b* has been navigated to, the user may use the input device 160 to generate an indication to select filter 225*b*. APP 134 may acquire the indication and apply filter 225*b*. Applying the filter 225*b* may include applying the filter 225*b* to list 136 to identify one or more video programs based on, for example, criteria that may be associated with the filter 225*b*.

For example, list 136 may include a list of video programs that the user may be entitled to view due to a subscription with a service provider that provides the video programs. Filter 225*b* may be defined to identify certain types of video programs (e.g., action movies, sports events, documentaries). Suppose that filter 225*b* is defined to identify action movies. APP 134 may apply filter 225*b* to list 136 and identify video programs that may be tagged as action movies.

After applying filter 225*b*, APP 134 may display information about the identified video programs. Screen 200*d* illustrates an example technique that may be used to display this information. In screen 200*d* information about the identified video programs may be added to a video program listing 250 by sliding the information into the video program listing entries 252. For example, animation may be used to slowly slide the information into video program listing entries 252 contained into the program listing 250, as illustrated in screen 200*d*. Screen 200*e* provides an example illustration of the video program listing 250 after the animation has completed.

It should be noted that the selected filter may be saved and applied when entering screen 200. For example, suppose screen 200 is entered and a user has selected filter 225*b* as described above. APP 134 may store this filter selection in storage, such as primary storage 130 and/or secondary storage 150. Now suppose screen 200 is exited and then entered again (e.g., due to the user's interaction with computing device 100). Prior to entering screen 200 for the second time, APP 134 may apply acquire the stored filter selection and apply filter 225b to identify one or more video programs. After identifying the video programs, APP 134 may display screen 200 where the video program listing entries 252a-f in screen 200 may include information about one or more of the identified video programs.

A video browser may include provisions for (1) displaying a list of video programs that may be currently airing, and (2) enabling a video program displayed in the list of video programs to be selected. Selecting the video program may cause the video program to be displayed. The video program may be displayed, for example, on an output device, such as output device 170.

Figure 5A:
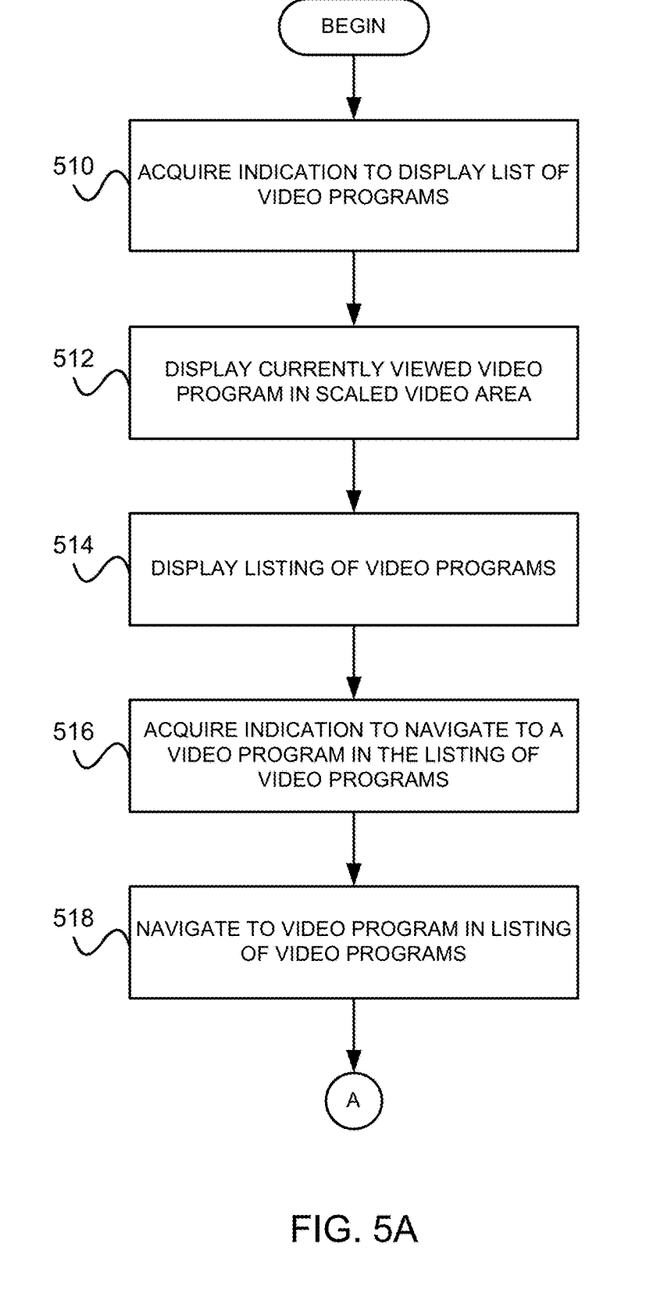
FIGS. 5A-B illustrate a flow diagram of example acts that may be used to select a video program from a listing of video programs.
Figure 5B:
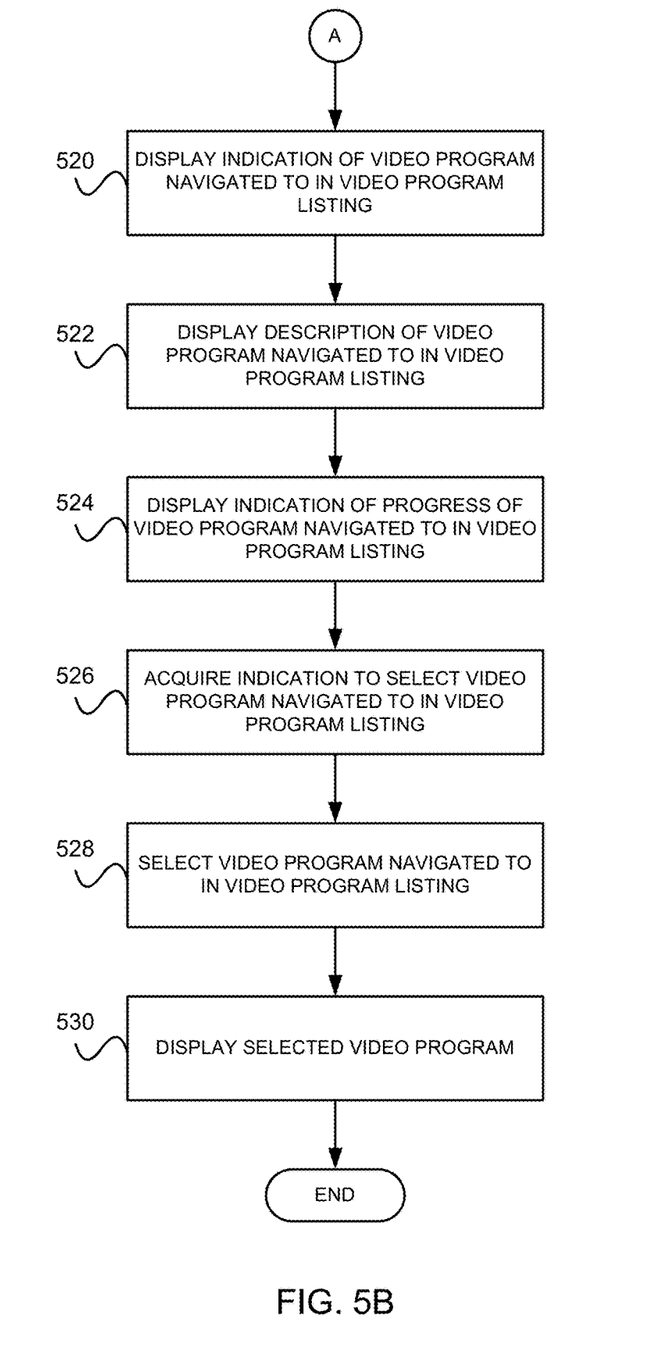

FIGS. 5A-B illustrate a flow diagram of example acts that may be used to display a video program selected from a listing of video programs. Referring to FIG. 5A, at block 510, an indication to display a list of video programs may be acquired. For example, suppose a user presses a button on an input device 160. Further, suppose that the button is associated with invoking a video browser implemented by APP 134. The indication may be generated based on, for example, the button being pressed. The indication may be forwarded to APP 134 which may receive the indication.

At block 512, a scaled version of a video program being currently viewed may be displayed and, at a block 514, a listing of video programs may be displayed. For example, suppose a user is currently viewing a video program on an output device 170 when the user presses the button on an input device 160 to generate an indication as described above. After receiving the indication, APP 134 may display video browser screen 200 on an output device 170. APP 134 may also generate a scaled version of a video program being currently being viewed and display the scaled version of the video program in a scaled video area 210 of the screen 200. In addition, APP 134 may identify one or more video programs and display information about the identified video programs in video program listing 250 in the screen 200, such as described above.

At block 516, an indication to navigate to a video program in the listing of video programs may be acquired. For example, the user may use the input device 160 to generate an indication to navigate the video program listing 250. The indication may be generated, for example, based on the user pressing a button on the input device 160. APP 134 may receive the indication.

At block 518, a video program in the listing of video programs may be navigated to. For example, the user may use the input device 160 to generate an indication to navigate the video program listing 250 to a video program listing entry 252 associated with the video program. The indication may be generated, for example, based on the user pressing a button on the input device 160. APP 134 may receive the indication and navigate to the entry 252.

At block 520 (FIG. 5B), an indication of the video program navigated to may be displayed. For example, after navigating to the video program listing entry 252, APP 134 may provide an indication that the video program listing entry 252 has been navigated to. The indication may be provided in screen 200. For example, the indication may be provided by highlighting the entry 252, such as described above, to indicate the entry 252 has been navigated to. Note that other indications may be provided in screen 200 to indicate the entry 252 has been navigated to.

At block 522, a description of the video program navigated to may be displayed. For example, after navigating to the video program listing entry 252, APP 134 may display information associated with the video program represented by the video program listing entry 252 in a video program information area 230 of screen 200.

At block 524, an indication of a progress of the video program navigated to may be displayed. For example, after navigating to the video program listing entry 252, APP 134 may display a progress bar in screen 200. The progress bar may indicate an amount of time associated with the video program represented by the video program listing entry 252. The amount of time may indicate, for example, an amount of time left in the video program, an elapsed time associated with the video program, and/or some other amount of time that may be associated with the video program.

At block 526, an indication to select the video program navigated to may be acquired and, at block 528, the video program is selected. For example, the user may use the input device 160 to generate an indication to select the video program. APP 134 may receive the indication and select the video program represented by the video program listing entry 252 that was navigated to. Selecting the video program may include, for example, tuning to the video program. Here, tuning may include, for example, programming a tuner that may be associated with computing device 100 to tune to the video program, navigate to an Internet site that may be streaming the video program, and/or otherwise tuning to the video program.

At block 530, the selected video program is displayed. For example, after selecting the video program, APP 134 may display the selected video program on an output device 170.

A video browser may include provisions for controlling which video programs may be included in a video program listing. The video browser may include one or more filters which may be used to provide these provisions. The provisions may include provisions for displaying a list of filters, navigating the list of filters, and enabling a selection of a filter. A selected filter may be applied by the video browser to a list of video programs to select video programs from the list that, for example, meet criteria that may be associated with the filter. Video programs from the selected video programs may be included in the video program listing.

Figure 6A:
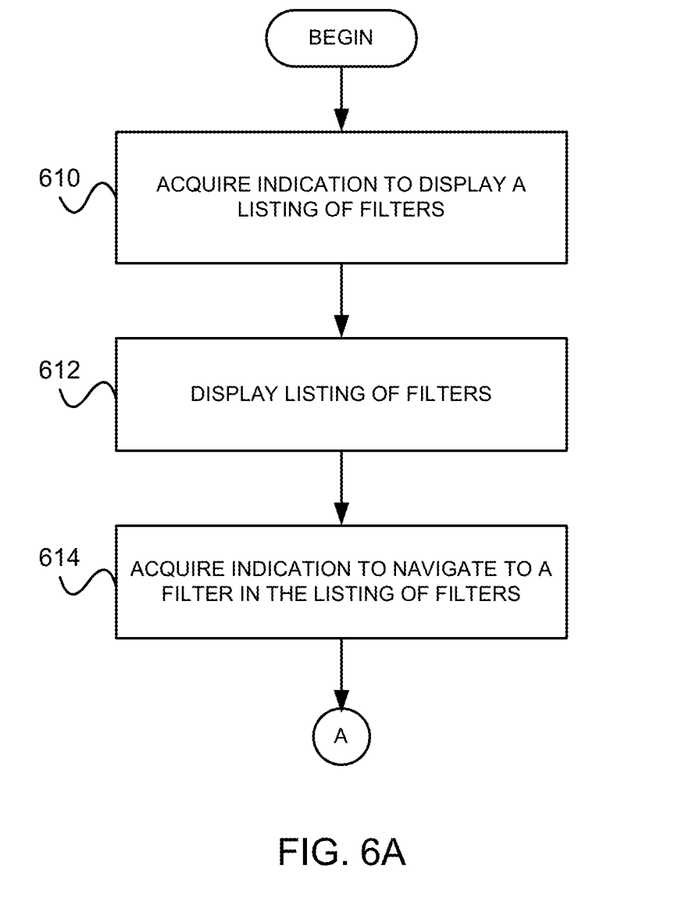
FIGS. 6A-B illustrate a flow diagram of example acts that may be used to select a filter that may be used to identify video programs that may be included in a listing of video programs.
Figure 6B:
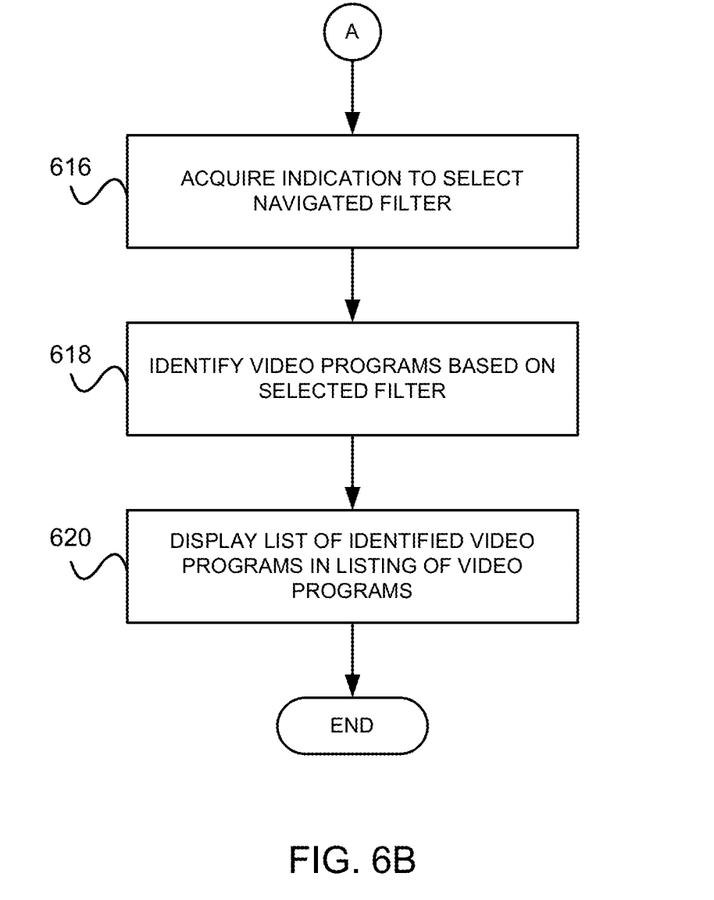

FIGS. 6A-B illustrate a flow diagram of example acts that may be used to select a filter that may be used to identify video programs that may be included in a listing of video programs. Referring to FIG. 6A, at block 610, an indication to display a listing of filters is acquired. For example, suppose a user presses a button (on an input device 160) that is associated with displaying a list of filters. An indication may be generated based on, for example, the button being pressed. The indication may be forwarded to APP 134 which may receive the indication.

At block 612, a listing of filters may be displayed. For example, suppose APP 134 has displayed screen 200 on an output device 170. After APP 134 receives the above indication, APP 134 may display a listing of filters in filter bar 220 of the screen 200.

At block 614, an indication to navigate to a filter in the listing of filters is acquired. For example, the user may press a button (on the input device 160) which may be associated with navigating to a filter 225 in the filter bar 220. Pressing the button may cause an indication to be generated where the indication may indicate that the filter bar 220 is being navigated to the filter 225. APP 134 may receive the indication and navigate to the filter 225. APP 134 may provide an indication in the filter bar 220 that the filter 225 has been navigated to, such as described above.

At block 616 (FIG. 6B), an indication to select the navigated filter may be acquired. For example, suppose that after navigating to the filter 225, the user presses a button on the input device 160 to select the filter 225. Pressing the button may cause an indication to be generated that may indicate that the filter 225 is being selected. APP 134 may receive the indication and select the filter 225.

At block 618, video programs may be identified based on the selected filter. For example, after receiving the indication that the filter 225 has been selected, APP 134 may apply the filter to list 136 to identify one or more video programs in the listing that match a criteria associated with the selected filter 225.

At block 620, a list of video programs identified at block 618 is displayed in a listing of video programs. For example, suppose APP 134 identifies ten video programs that meet the criteria associated with the selected filter 225. APP 134 may display information associated with six of the identified programs in video program listing entries 252*a-f* in screen 200.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 5A-B and 6A-B, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and/or hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain features of the invention may be implemented using computer-executable instructions that may be executed by processing logic, such as, for example, processing logic 120. The computer-executable instructions may be stored on one or more non-transitory tangible computer-readable storage media, such as, for example primary storage 130 and/or secondary storage 150. The media may be volatile or non-volatile and may include, for example, DRAM, SRAM, flash memories, removable disks, non-removable disks, and so on.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:

via computer processor hardware, performing operations of:
  receiving an indication to display a listing of a plurality of filters in a video browser screen displayed on an output device;
  displaying the listing of filters in the video browser screen in response to the received indication;
  receiving an indication to select a filter in the listing of filters;
  displaying a description of the selected filter in the video browser screen, the description being displayed in the video browser screen separate from the displayed listing of filters;
  displaying a first list of video programs arranged as a carousel in the video browser screen, the first list of video programs having a first plurality of video program entries, respectively;
  in response to the receiving of the indication to select the filter in the listing of filters, displaying a second list of video programs arranged as the carousel in the video browser screen, the second list of video programs having a second plurality of video program entries, the second plurality of video program entries being determined based on the selected filter, an entry of the second plurality of video program entries representing a video program provided by a service provider, the displaying of the second list of video programs including sliding the second plurality of video program entries into the first plurality of video program entries, respectively, until the first list of video programs in the carousel is obscured from a user's view and the second list of video programs in the carousel is viewable by the user;
  receiving an indication to navigate to the entry in the carousel;
  navigating to the entry in the carousel;
  receiving an indication to select the entry in the carousel;
  selecting the entry in the carousel;
  tuning to a channel on which the video program as indicated by the selected entry is available; and
  displaying the video program associated with the selected entry on the output device.

2. The method of claim 1, further comprising:
receiving an indication to display the video browser screen.

3. The method of claim 1, further comprising:
navigating to the entry in the second list of video programs; and
displaying an indication in the video browser screen that the entry has been navigated to.

4. The method of claim 3, wherein the indication that the entry has been navigated to is displayed in the carousel.

5. The method of claim 3, further comprising:
displaying a progress of the video program, represented by the entry navigated to, in the video browser screen.

6. The method of claim 3, further comprising:
displaying information about the video program, represented by the entry navigated to, in a video program information area of the video browser screen.

7. The method of claim 1, wherein the output device is displaying video associated with a currently viewed video program prior to displaying the video browser screen, and wherein the method further comprises:
displaying a scaled version of the currently viewed video program in a scaled video area of the video browser screen.

8. The method of claim 1, wherein the user is a subscriber, and wherein the method further comprises:
   receiving an indication to navigate to the filter in the listing of filters;
   receiving an indication to select the filter navigated to;
   applying the selected filter to the first list of video programs associated with the subscriber and maintained in a storage, the second list of video programs having the second plurality of video program entries where the entry represents the video program, the selected filter being applied to identify the video program represented by the entry that matches a criteria associated with the selected filter; and
   displaying information about the identified video program in the video browser screen.

9. The method of claim 8, wherein the information about the identified video program is displayed in the carousel.

10. The method of claim 1, wherein video program represented by the entry is currently being aired by the service provider.

11. The method of claim 1, wherein the video program represented by the entry is a video on demand video program that is provided by the service provider.

12. A tangible non-transitory computer-readable media storing computer-executable instruction for:
   receiving an indication to display a listing of a plurality of filters in a video browser screen displayed on an output device;
   displaying the listing of filters in the video browser screen in response to the receive indication;
   receiving an indication to select a filter in the listing of filters;
   displaying a description of the selected filter in the video browser screen, the description being displayed in the video browser screen separate from the displayed listing of filters;
   displaying a first list of video programs arranged as a carousel in the video browser screen, the first list of video programs having a first plurality of video program entries, respectively;
   in response to the receiving of the indication to select the filter in the listing of filters, displaying a second list of video programs arranged as the carousel in the video browser screen, the second list of video programs having a second plurality of video program entries, the second plurality of video program entries being determined based on the selected filter, an entry of the second plurality of video program entries representing a video program provided by a service provider, the displaying of the second list of video programs including sliding the second plurality of video program entries into the first plurality of video program entries, respectively, until the first list of video programs in the carousel is obscured from a user's view and the second list of video programs in the carousel is viewable by the user;
   acquiring an indication to navigate to the entry in the carousel;
   navigating to the entry in the carousel;
   acquiring an indication to select the entry in the carousel;
   selecting the entry in the carousel;
   tuning to a channel on which the video program as indicated by the selected entry is available; and displaying the video program associated with the selected entry on the output device.

13. The tangible non-transitory computer-readable media of claim 12, further storing computer-executable instructions for:
   navigating to the entry in the second list of video programs; and
   displaying an indication in the video browser screen that the entry has been navigated to.

14. The tangible non-transitory computer-readable media of claim 13, wherein the indication that the entry has been navigated to is displayed in the carousel.

15. The tangible non-transitory computer-readable media of claim 13, further storing computer-executable instructions for:
   displaying a progress of the video program, represented by the entry navigated to, in the video browser screen.

16. The tangible non-transitory computer-readable media of claim 13, further storing computer-executable instructions for:
   displaying information about the video program, represented by the entry navigated to, in a video program information area of the video browser screen.

17. The tangible non-transitory computer-readable media of claim 12, wherein the output device is displaying video associated with a currently viewed video program prior to displaying the video browser screen, and wherein the medium further stores computer-executable instructions for:
   displaying a scaled version of the currently viewed video program in a scaled video area of the video browser screen.

18. The tangible non-transitory computer-readable media of claim 12, wherein the user is a subscriber, and wherein the medium further stores computer-executable instructions for:
   receiving an indication to navigate to the filter in the listing of filters;
   receiving an indication to select the filter navigated to;
   applying the selected filter to the first list of video programs associated with the subscriber and maintained in a storage, the second list of video programs having the second plurality of video program entries where the entry represents the video program, the selected filter being applied to identify the video program represented by the entry that matches a criteria associated with the selected filter; and
   displaying information about the identified video program in the video browser screen.

19. The tangible non-transitory computer-readable media of claim 12, wherein video program represented by the entry is currently being aired by the service provider.

20. The tangible non-transitory computer-readable media of claim 12, wherein the video program represented by the entry is a video on demand video program that is provided by the service provider or was recorded by a video recording device provided by the service provider.

21. A system comprising:
   processing logic that contains hardware, the processing logic for:
      receiving an indication to display a listing of a plurality of filters in a video browser screen displayed on an output device,
      displaying the listing of filters in the video browser screen in response to the received indication,
      receiving an indication to select a filter in the listing of filters,
      displaying a description of the selected filter in the video browser screen, the description being displayed in the video browser screen separate from the displayed listing of filters, displaying a first list of video programs arranged as a carousel in the video browser screen, the first list of video programs having a first plurality of video program entries, respectively;

in response to the receiving of the indication to select the filter in the listing of filters, displaying a second list of video programs arranged as the carousel in the video browser screen, the second list of video programs having a second plurality of video program entries, the second plurality of video program entries being determined based on the selected filter, an entry of the second plurality of video program entries representing a video program being aired by a service provider, the displaying of the second list of video programs including sliding the second plurality of video program entries into the first plurality of video program entries, respectively, until the first list of video programs in the carousel is obscured from a user's view and the second list of video programs in the carousel is viewable by the user;

receiving an indication to navigate to the entry in the carousel, navigating to the entry in the carousel, receiving an indication to select the entry in the carousel, selecting the entry in the carousel, tuning to a channel on which the video program as indicated by the selected entry is available; and displaying the video program associated with the selected entry on the output device.

22. The system of claim 21, wherein the user is a subscriber, and wherein the processing logic further:

receives an indication to navigate to the filter in the listing of filters, receives an indication to select the filter navigated to, applies the selected filter to the first list of video programs associated with the subscriber and maintained in a storage, the second list of video programs having the second plurality of video program entries where the entry represents the video program, the selected filter being applied to identify the video program represented by the entry that matches a criteria associated with the selected filter, and displays information about the identified video program in the video browser screen.

23. The system of claim 21, wherein video program represented by the entry is currently being aired by the service provider.

24. The system of claim 21, wherein the video program represented by the entry is a video on demand video program that is provided by the service provider or was recorded by a video recording device provided by the service provider.

25. The method of claim 1, further comprising:

displaying, in the video browser screen, playback progress information indicating a progress of playing back the video program as indicated by the selected entry.

26. The method as in claim 1, wherein each of the filters is operable to filter identities of the video programs.

27. The method as in claim 1, wherein tuning to the channel includes: utilizing a tuner to tune to the video program.

28. The method as in claim 1, wherein tuning to the channel includes: navigating to an Internet site to retrieve the video program.

* * * * *